US011104065B2

(12) United States Patent
Prasad et al.

(10) Patent No.: US 11,104,065 B2
(45) Date of Patent: Aug. 31, 2021

(54) MATERIAL SETS (71) Applicant: Hewlett-Packard Development Company, L.P., Houston, TX (US)

(72) Inventors: Keshava A Prasad, San Diego, CA (US); Alexey S Kabalnov, San Diego, CA (US); Stephen G. Rudisill, San Diego, CA (US); Ali Emamjomeh, San Diego, CA (US); Michael Novick, San Diego, CA (US); Bernardo Gutierrez, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 329 days.

(21) Appl. No.: 16/073,634

(22) PCT Filed: Apr. 28, 2016

(86) PCT No.: PCT/US2016/029891
§ 371 (c)(1),
(2) Date: Jul. 27, 2018

(87) PCT Pub. No.: WO2017/188966
PCT Pub. Date: Nov. 2, 2017

(65) Prior Publication Data
US 2019/0039296 A1    Feb. 7, 2019

(51) Int. Cl.
*C09D 11/033* (2014.01)
*C09D 11/40* (2014.01)
(Continued)

(52) U.S. Cl.
CPC ............ *B29C 64/165* (2017.08); *B33Y 70/00* (2014.12); *C09C 1/48* (2013.01); *C09D 11/033* (2013.01);
(Continued)

(58) Field of Classification Search
CPC ...................................................... C09D 11/40
(Continued)

(56) References Cited

U.S. PATENT DOCUMENTS

| 5,204,055 A | 4/1993 | Sachs et al. |
| 6,599,444 B2 | 7/2003 | Burnell-Jones |

(Continued)

FOREIGN PATENT DOCUMENTS

| CN | 103842157 | 6/2014 |
| CN | 104470703 | 3/2015 |

(Continued)

OTHER PUBLICATIONS

Hergel et al. Clean Color: Improving Multi-filament 3D Prints—2014—<http://citeseerx.ist.psu.edu/viewdoc/download?doi=10.1.1.686.8992&rep=rep1&type=pdf>.
(Continued)

Primary Examiner — Khanh T Nguyen
(74) Attorney, Agent, or Firm — HPI Patent Department (57) ABSTRACT

The present disclosure is drawn to material sets and 3-dimensional printing systems that include a fusing agent. One example of a material set can include a fusing agent and a detailing agent. The fusing agent can include water, a carbon black pigment, and a water-soluble co-solvent in an amount from 20 wt % to 60 wt %. The detailing agent can include water and a black dye. In another example, a material set can include a fusing agent and a thermoplastic polymer powder.

13 Claims, 3 Drawing Sheets

(51) Int. Cl.

| | |
|---|---|
| *B29C 64/165* | (2017.01) |
| *C09D 11/324* | (2014.01) |
| *C09D 11/328* | (2014.01) |
| *B33Y 70/00* | (2020.01) |
| *C09C 1/48* | (2006.01) |
| *C09D 11/326* | (2014.01) |
| *C09D 11/037* | (2014.01) |
| *C09D 11/102* | (2014.01) |
| *B33Y 10/00* | (2015.01) |
| *B33Y 30/00* | (2015.01) |
| *B29K 101/12* | (2006.01) |
| *B29K 105/00* | (2006.01) |

(52) U.S. Cl.
CPC .......... *C09D 11/037* (2013.01); *C09D 11/102* (2013.01); *C09D 11/324* (2013.01); *C09D 11/326* (2013.01); *C09D 11/328* (2013.01); *C09D 11/40* (2013.01); *B29K 2101/12* (2013.01); *B29K 2105/251* (2013.01); *B33Y 10/00* (2014.12); *B33Y 30/00* (2014.12)

(58) Field of Classification Search
USPC ........................................ 106/31.27; 358/1.9
See application file for complete search history.

(56) References Cited

U.S. PATENT DOCUMENTS

| | | | |
|---|---|---|---|
| 7,972,426 B2 | 7/2011 | Hinch et al. | |
| 8,110,257 B2* | 2/2012 | Nagashima | B41J 2/1433 428/32.19 |
| 8,167,999 B2 | 5/2012 | Alam et al. | |
| 8,651,390 B2 | 2/2014 | Hinch et al. | |
| 9,643,359 B2 | 5/2017 | Baumann et al. | |
| 2003/0079643 A1* | 5/2003 | Tomioka | C09D 11/40 106/31.27 |
| 2003/0153649 A1 | 8/2003 | Bromberg | |
| 2004/0126567 A1 | 7/2004 | Dimond et al. | |
| 2007/0238056 A1 | 10/2007 | Baumann et al. | |
| 2008/0231873 A1* | 9/2008 | Kabalnov | C09D 11/40 358/1.9 |
| 2014/0088751 A1 | 3/2014 | Pridoehl et al. | |
| 2015/0094394 A1 | 4/2015 | Jung et al. | |
| 2015/0165689 A1 | 6/2015 | Travers et al. | |
| 2015/0258770 A1 | 9/2015 | Chan et al. | |

FOREIGN PATENT DOCUMENTS

| | | |
|---|---|---|
| WO | WO-2007114895 A2 | 10/2007 |
| WO | WO-2014058539 | 4/2014 |
| WO | WO-2015108543 A1 | 7/2015 |
| WO | WO-2015167520 | 11/2015 |
| WO | WO-2016048380 A1 | 3/2016 |
| WO | WO-2016171724 | 10/2016 |
| WO | WO2006132427 A1 | 12/2016 |

OTHER PUBLICATIONS

Faraday, Michael. "X. The Bakerian Lecture,—Experimental relations of gold (and other metals) to light." Philosophical Transactions of the Royal Society of London 147 (1857): 145-181.

Garcia, Guillermo, et al. "Dynamically modulating the surface plasmon resonance of doped semiconductor nanocrystals." Nano letters 11.10 (2011): 4415-4420.

Gross, Bethany C., et al. "Evaluation of 3D printing and its potential impact on biotechnology and the chemical sciences." (2014): 3240-3253.

Kanehara, Masayuki, et al. "Indium tin oxide nanoparticles with compositionally tunable surface plasmon . . . " Jml of the Amer Chem Society 131.49, 200,: 17736-17737.

Milligan, W. O., and R. H. Morriss. "Morphology of Colloidal Gold—A Comparative Study." Journal of the American Chemical Society 86.17 (1964): 3461-3467.

Usui, Hiroyuki, Takeshi Sasaki, and Naoto Koshizaki, "Optical transmittance of indium tin oxide nanoparticles prepared by laser-induced fragmentation in water." The Journal of Physical Chemistry B 110.26 (2006): 12890-12895.

Van der Zande, Bianca MI, et al. "Aqueous gold sols of rod-shaped particles." The Journal of Physical Chemistry B 101.6 (1997): 852-854.

Weiser, H., et al., "Von Weimark's Precipitation Theory and the Formation of Colloidal Gold", 10 pages, The Rice Institute, Houston, TX.

\* cited by examiner

MATERIAL SETS

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, as well as others. In selective laser sintering, for example, a powder bed may be exposed to point heat from a laser to melt the powder wherever the object is to be formed. This allows for manufacturing complex parts that are difficult to manufacture using traditional methods. However, systems for 3D printing have historically been very expensive, though those expenses have been coming down to more affordable levels recently. In general, 3D printing technology improves the product development cycle by allowing rapid creation of prototype models for reviewing and testing. Unfortunately, the concept has been somewhat limited with respect to commercial production capabilities because the range of materials used in 3D printing can be likewise limited. Therefore, research continues in the field of new techniques and materials for 3D printing.

The figures depict examples of the presently disclosed technology. However, it should be understood that the present technology is not limited to the examples depicted.

DETAILED DESCRIPTION

The present disclosure is drawn to the area of 3-dimensional printing. More specifically, the present disclosure provides material sets and systems for printing 3-dimensional parts that include a fusing agent and a detailing agent. In an exemplary printing process, a thin layer of thermoplastic polymer powder can be spread on a bed to form a powder bed. A printing head, such as a fluid jet print head, can then be used to print a fusing agent over portions of the powder bed corresponding to a thin layer of the three dimensional object to be formed. The fusing agent can include an energy absorber to absorb electromagnetic energy to generate sufficient heat to fuse the thermoplastic polymer powder. In some examples, the energy absorber can include a carbon-based pigment, such as a carbon black pigment. Carbon black pigments can effectively absorb electromagnetic radiation across a wide range of wavelengths. Therefore, carbon black pigments can effectively raise the temperature of the thermoplastic polymer powder onto which they may be printed. A detailing agent can be printed onto portions of the powder bed around the edges of the portions printed with the fusing agent. The detailing agent can act to cool the powder onto which it may be printed. Then the bed can be exposed to a light source, e.g., typically the entire bed. The fusing agent can absorb more energy from the light than the powder printed with the detailing agent or the surrounding unprinted powder. The absorbed light energy may be converted to thermal energy, causing the printed portions of the powder to melt and coalesce. This forms a solid layer. The portions of the powder printed with the detailing agent can be at a lower temperature because of the cooling effect of the detailing agent. This can prevent the powder around the edges of the solid layer from coalescing due to thermal bleed from the hotter powder that was printed with the fusing agent. After the first layer is formed in this way, a new thin layer of polymer powder can be spread over the powder bed and the process can be repeated to form additional layers until a complete 3-dimensional part is printed. Such 3-dimensional printing processes can achieve fast throughput with good accuracy.

In some examples of the presently disclosed technology, the detailing agent can be jettable, that is, formulated for use in a fluid jet printer such as a thermal inkjet printer. Fluid jet printing technology can be used to print the detailing agent onto the powder bed with high speed and high resolution. Various properties of the detailing agent can be adjusted to improve the performance of the detailing agent in fluid jet printing. For example, the detailing agent can be formulated to have low kogation, which refers to solid deposits formed on resistors in a thermal fluid jet printing system. In further examples, the detailing agent can be formulated to provide good decap performance, i.e., a low number of firing cycles required to resume printing from a fluid jet pen after the pen is idle for a period of time.

In addition to properties of the detailing agent that allow the detailing agent to be printed using fluid jet technology, the detailing agent can also be formulated to provide a strong cooling effect on the powder onto which the detailing agent may be printed. This cooling effect can increase the temperature difference between the powder printed with the fusing agent and the powder printed with the detailing agent during curing of the powder bed. A large temperature difference can help to provide that the powder printed with the detailing agent does not become fused while the powder printed with the fusing agent may be fused. In some examples, the detailing agent can have a high water content, such as 70 wt % to 90 wt %, to provide evaporative cooling of the powder onto which the detailing agent may be printed.

An additional function of the detailing agent can include improving the appearance of the final 3-dimensional printed part. The detailing agent can be printed around the edges of each layer of the part. The edges of each layer make up the exterior surfaces of the final part. Thus, in some examples the detailing agent can include one or more colorants to modify the appearance of the exterior surfaces of the final part. In certain examples, the fusing agent used to fuse the layers can include a carbon black pigment as an energy absorber. The carbon black pigment can impart a black or dark gray color to the part. However, although the interior bulk volume of the part can have a consistent black color, the surfaces of the final part can sometimes have uneven coloration due to particles of the thermoplastic polymer powder that may be only partially colored by the carbon black pigment, or particles that may be uncolored by the carbon black pigment yet become embedded in the surface of the part. Therefore, in some examples the detailing agent can include colorants to improve the coloration of the surfaces of the part. Because the detailing agent can be printed around the edges of each layer of the part, the powder particles around the edges can be colored by the colorants in the detailing agent. If the colorants in the detailing agent are selected to match the bulk color of the printed part, then any polymer particles that become embedded in surfaces of the part can also have a matching color. Thus, the color uniformity of the final part can be improved.

In some cases, matching the color of the detailing agent with the bulk color of the 3-dimensional printed part can present challenges. For example, when dyes are used as colorants in the detailing agent, it has been found that certain dyes can migrate differently from other dyes when applied to polymer powder. Without being bound to a particular theory, this may be related to differences in solubility of various dyes in the polymer powder. Such differences between dyes used in the detailing agent can lead to unexpected color changes when the detailing agent may be printed on the polymer powder. In one example, a detailing agent with dyes that appear to have a neutral black color can experience a hue shift toward a purple hue when the detailing agent may be printed on a polymer powder and cured. Thus, balancing the colorants in the detailing agent while also providing good cooling effect and good jetting properties can be challenging. However, certain formulations can provide detailing agents that function well as detailing agents in the 3-dimensional printing processes described herein, while also providing good jetting properties and uniform coloration of the surfaces of the final 3-dimensional printed part.

With this description in mind, some examples of the presently disclosed technology involve material sets including a fusing agent and a detailing agent. The fusing agent and detailing agent can each be formulated for fluid jet printing. In additional examples, the presently disclosed technology can encompass material sets made up of a fusing agent, a detailing agent, and a thermoplastic polymer powder. As explained above, the fusing agent can be printed onto portions of a thermoplastic polymer powder bed and the bed can be irradiated with electromagnetic radiation to fuse the printed portions. This forms a single layer of the 3-dimensional part being printed. The detailing agent can be printed in areas at or near the edges of the portions that may be printed with the fusing agent. The detailing agent can have the effect of cooling the polymer powder around the edges of the portions printed with the fusing agent. Thus, when the portions printed with the fusing agent are fused by irradiation with electromagnetic energy, the polymer powder around the edges can remain at a lower temperature. This can prevent fusing of the polymer powder surrounding the edges of the fused layer, improving selectivity between the fused portions and the unfused portions of the powder bed.

Examples of the material sets described above are shown in more detail in FIG. 1. With specific reference to FIG. 1, a) shows a build platform or movable floor 110 of a 3-dimensional printing system, to which is deposited a thin layer of thermoplastic polymer powder 115 to form a powder bed. Next, b) shows droplets of a fusing agent 120*a* as well as already deposited fusing agent 120*b* applied to and within a portion of the powder bed. Droplets of a detailing agent 125*a* may be applied to portions of the powder bed adjacent to the edges of the portion printed with the fusing agent. The fusing agent 120*b* and detailing agent 125*b* applied to the powder bed admix and fill voids within the powder, as shown in c). The portion of the powder bed printed with the fusing agent may be then fused using a curing lamp 130 to form a fused part layer 135. In some cases the detailing agent can substantially evaporate off of the powder bed, leaving unfused thermoplastic polymer powder around the edge of the fused part layer. The build platform or moveable floor can then be lowered and the process can be repeated with additional layers of thermoplastic polymer powder to form additional fused layers of the 3-dimensional printed part.

Figure 1:
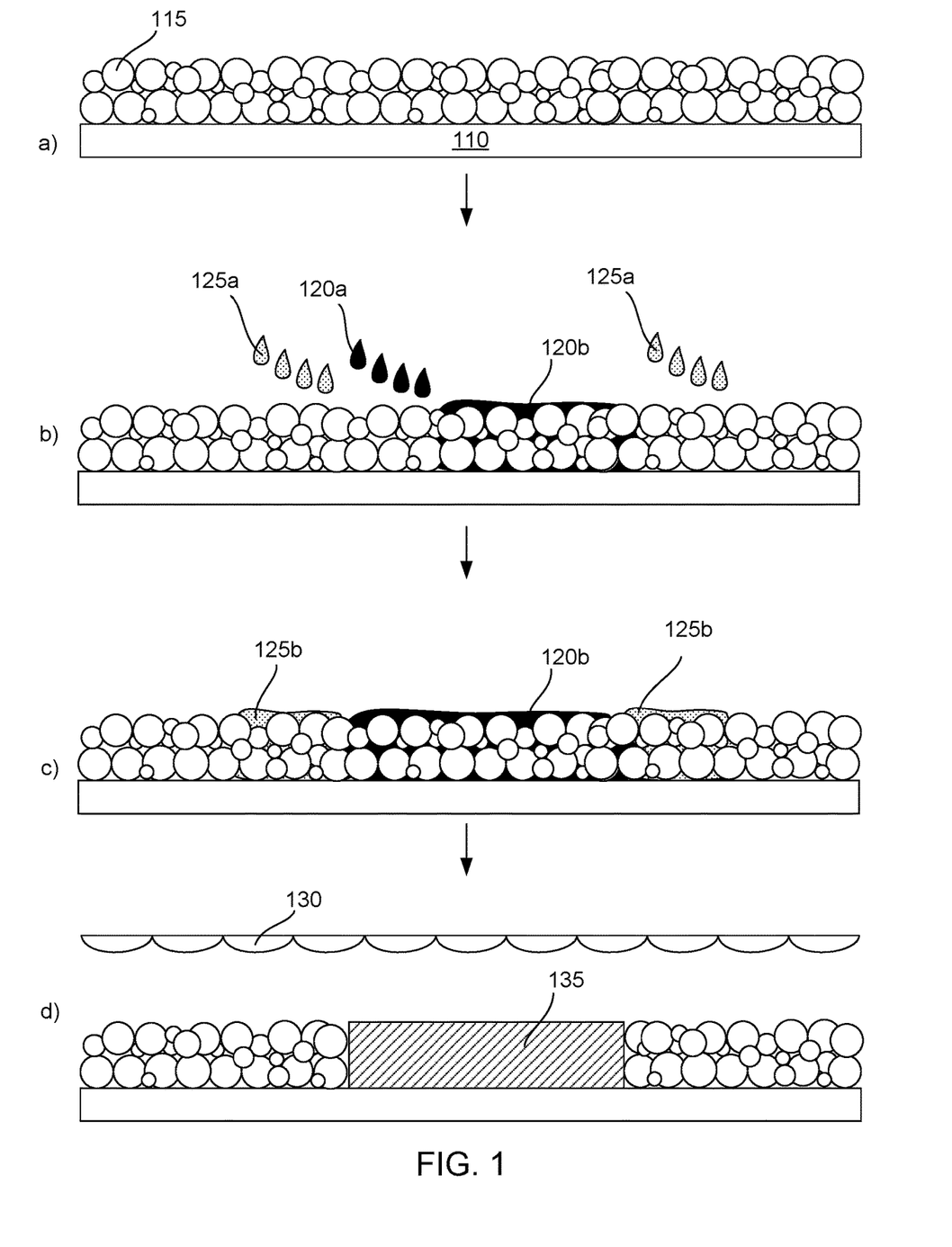
FIG. 1 is a close-up side cross-sectional view of a layer of thermoplastic polymer powder, a fusing agent, and a detailing agent in accordance with examples of the present disclosure.

It should be noted that the fused part layer 135 shown in FIG. 1 is an idealized depiction of the fused layers formed in practice. In some cases, fused layers formed using the processes described herein do not have a perfect rectangular cross section as shown in FIG. 1, because edges of the fused layers can often include partially fused polymer particles embedded into the fused layers. This can result in a surface that may be uneven or bumpy at the scale of the individual particles. However, in some examples the thermoplastic polymer particles can be small enough that the parts printed therefrom still have a smooth appearance when viewed by the human eye.

In some cases, partially fused particles at the edges of the 3-dimensional printed part can result in an appearance of uneven coloration of the part. As mentioned above, in some examples the fusing agent can include a carbon black pigment as an energy absorber. Such pigments can produce a dark black color in the 3-dimensional printed part. In some examples, the thermoplastic polymer powder can naturally have a light, white, or translucent color. Thus, when particles of the thermoplastic polymer powder that have not been printed with the carbon black pigment become embedded at the surface of the 3-dimensional printed part, the unprinted particles do not have the same black color. This can result in an uneven grayish appearance at the surfaces of the 3-dimensional printed part.

To improve the appearance of the 3-dimensional printed part, in some examples the detailing agent can include one or more dyes to color the thermoplastic polymer particles at the edges of the fused layers of the 3-dimensional part. In a particular example, the detailing agent can include a black dye and a cyan dye. The black dye and cyan dye can provide a black color to the portions of the powder bed that may be printed with the detailing agent. The combination of black and cyan dyes can provide a color that more closely matches the color of the bulk color of the part compared to using a black dye alone. At the same time, the dyes can absorb less electromagnetic energy compared to the carbon black pigment in the fusing agent. Thus, the detailing agent can still effectively cool the powder around the edges of each fused part layer. When particles of the powder printed with the detailing agent become embedded into the surface of the fused part, the black color of the particles can more closely match the black color of the fused part.

Figure 2:
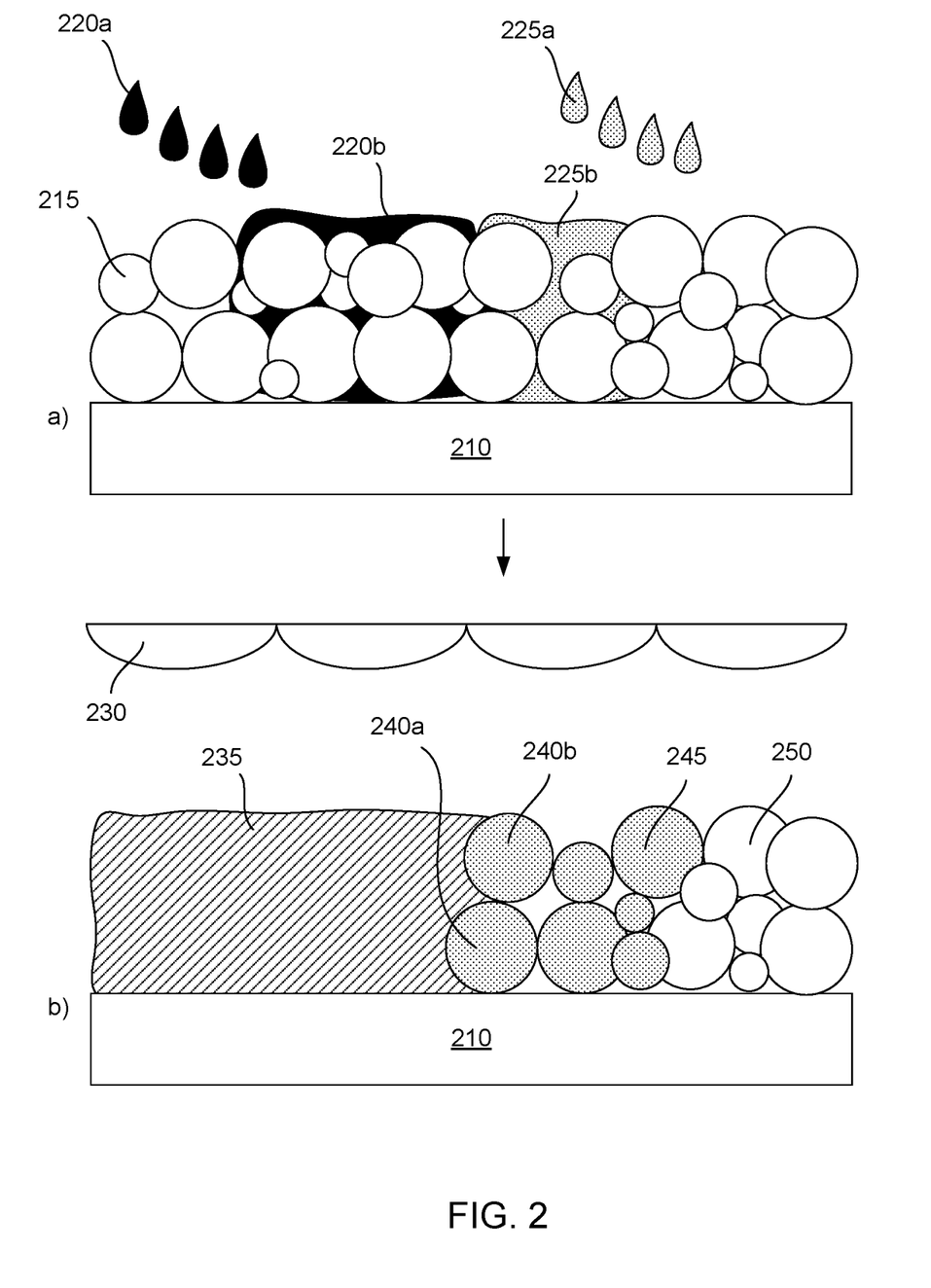
FIG. 2 is a close-up side cross-sectional view of a layer of thermoplastic polymer powder, a fusing agent, and a detailing agent in accordance with examples of the present disclosure.

The use of such a detailing agent with a fusing agent and a thermoplastic polymer powder is shown in more detail in FIG. 2. Referring specifically to FIG. 2, a) shows a build platform or moveable floor 210 with a thin layer of thermoplastic polymer powder 215 spread thereon to form a powder bed. Droplets of a fusing agent 220*a* and deposited fusing agent 220*b* are shown in a portion of the powder bed that is to be fused. Droplets of a detailing agent 225*a* and deposited detailing agent 225*b* are also shown at an edge of the portion to be fused. After curing with a curing lamp 230, the portion printed with the fusing agent fuses to form a fused part layer 235. Embedded particles 240*a*, 240*b* at the edge of the fused part layer have a black color due to the black and cyan dyes in the detailing agent. Thus, the color of the embedded particles matches the black color of the fused part layer. Additional loose particles 245 that were printed with the detailing agent also have a black color. Unprinted particles 250 outside the portions printed with the detailing agent retain their original color.

In a particular example of the presently described technology, a material set can include a detailing agent and a fusing agent. The detailing agent can include water, a black dye, a cyan dye, and a water soluble co-solvent present in the detailing agent at an amount from 10 wt % to 20 wt %. The fusing agent can include water and a carbon black pigment. In another particular example, the fusing agent can also include a water soluble co-solvent present in the fusing agent at an amount from 20 wt % to 60 wt %.

In some examples, the carbon black pigment can be in the form of a dispersion of carbon black pigment particles. The dispersion stability and particle size of the carbon black pigment dispersion can each affect the jettability of the fusing agent. As used herein, "dispersion stability" refers to the ability of the carbon black pigment particles to remain dispersed without aggregating to form large aggregate particles that interfere with jetting. Dispersion stability can be measured in various ways. In one example, dispersion stability can be stated as a measurement of average pigment particle size over time. Pigments with a high dispersion stability can have an average particle size that remains stable over time, while pigments with a low dispersion stability can show increased particle size over time. In another example, dispersion stability can be measured by counting the number of particles with a particle size over a certain threshold particle size for a period of time. Pigments with low dispersion stability will show an increase in the number of large particles over time. When pigment particles aggregate to form larger aggregate particles, the viscosity of the fusing agent can also increase. Therefore, the dispersion stability can also be measured by measuring viscosity of the fusing agent over time.

In certain examples, the carbon black pigment can have a primary particle size from 2 nm to 50 nm. Additionally, the carbon black pigment can have an aggregate particle size from 60 nm to 200 nm.

In further examples, the carbon black pigment can be dispersed by a dispersing agent. In certain examples, the dispersing agent can include a polymeric dispersing agent. Non-limiting examples of polymeric dispersing agents can include styrenes, maleic anhydrides, acrylics, or copolymers thereof. In particular examples, the dispersing agent can include a styrene acrylic copolymer such as Joncryl® styrene acrylic resins available from BASF. In other particular examples, the dispersing agent can include a styrene maleic anhydride copolymer such as SMA® styrene maleic anhydride resins available from TOTAL Cray Valley. Small molecule dispersing agents can also be used. In some examples, the carbon black pigment can be reacted with a diazonium salt to produce carbon black pigment particles having an organic dispersing group attached to the carbon black pigment particles. In further examples, the carbon black pigment can be in the form of a pigment dispersion such as a CAB-O-JET® carbon black pigment dispersion available from Cabot.

In some examples, the fusing agent can include the carbon black pigment in an amount from 5 wt % to 10 wt %, with respect to the total weight of the fusing agent.

In further examples, the fusing agent can include one or more additional energy absorbers. Similar to the carbon black pigment, these additional energy absorbers can also effectively absorb electromagnetic radiation to produce heat. Examples of other energy absorbers can include near-infrared absorbing dyes, near-infrared absorbing pigments, tungsten bronzes, molybdenum bronzes, metal nanoparticles, conjugated polymers, or combinations thereof.

Examples of near-infrared absorbing dyes include aminium dyes, tetraaryldiamine dyes, cyanine dyes, pthalocyanine dyes, dithiolene dyes, and others. In further examples, the energy absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof.

As mentioned, the energy absorbers can also include a conjugated polymer. As used herein, "conjugated" refers to alternating double and single bonds between atoms in a molecule. Thus, "conjugated polymer" refers to a polymer that has a backbone with alternating double and single bonds. In many cases, the energy absorbers can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In some examples, additional pigments and/or dyes can be included as colorants to modify the black color of the fusing agent. The colorant can be present in an amount from 0.1 wt % to 10 wt % in the fusing agent. In one example, the colorant can be present in an amount from 0.5 wt % to 5 wt %. In another example, the colorant can be present in an amount from 2 wt % to 10 wt %. In some examples, the colored inks can be used to print 3D parts that retain the natural color of the polymer powder, or a polymer powder that may be already colored to some degree. Additionally, in one example, the fusing agent can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St.

Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, Acid Black 2, Pacified RB31, and Projet™ Fast Black 2 (FUJIFILM Imaging Colorants Inc.).

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow SGT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described fusing agent, and thus ultimately, the printed part.

The components of the fusing agent can be selected to give the fusing agent good fluid jetting performance and the ability to fuse the polymer bed material and/or color the polymer powder with good optical density. Thus, the fusing agent can include a liquid vehicle. In some examples, the liquid vehicle formulation can include one or more co-solvents present in total at from 20 wt % to 60 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, and/or other vehicle components such as biocides, viscosity modifiers, materials for pH adjustment, sequestering agents, preservatives, and the like. In one example, the liquid vehicle can be predominantly water, e.g., more than 50 wt % water.

In some examples, the carbon black pigment and additional energy absorbers, if present, can be water-dispersible or water-soluble. Such energy absorbers can be used with an aqueous vehicle. Because the energy absorber can be dispersible or soluble in water, an organic co-solvent may not be present, as it may not be needed solubilize the energy absorber. Therefore, in some examples the fluids can be substantially free of organic solvent. However, in other examples a co-solvent can be used to help disperse other dyes or pigments, or improve the jetting properties of the respective fluids. In still further examples, a non-aqueous vehicle can be used with an organic-soluble or organic-dispersible energy absorber.

In certain examples, a high boiling point co-solvent can be included in the various fluids. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present in the various fluids at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

In a particular example, the fusing agent can include 2-pyrrolidone as a co-solvent. In further examples, the fusing agent can include multiple co-solvents selected from 2-pyrrolidone, triethylene glycol, LEG-1, and combinations thereof. In a certain example, the co-solvent in the fusing agent can include 2-pyrrolidone present in an amount from 10 wt % to 40 wt % with respect to the total weight of the fusing agent and triethylene glycol in an amount from 5 wt % to 20 wt % with respect to the total weight of the fusing agent. In certain other examples, the co-solvent can include 2-pyrrolidone and triethylene glycol, wherein the 2-pyrrolidone may be included in a greater amount than the triethylene glycol.

Regarding the surfactant that may be present, one or more surfactant can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from 0.01 wt % to 20 wt %. In more specific examples, amount of surfactant in the fusing agent can be from 0.5 to 2.0 wt %. In even more specific examples, the amount of surfactant in the fusing agent can be from 0.75 wt % to 1.0 wt %. Suitable surfactants can include, but are not limited to, Surfynol® SEF available from Air Products; TECO® Wet 510 available from Evonik Industries AG, TEGO Products; Capstone® FS-35 available from DuPont; liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate. In a particular example, the fusing agent can include TEGO® Wet 510 as a surfactant.

Consistent with the formulation of this disclosure, as mentioned, various other additives can be employed to improve certain properties of the fluid compositions for specific applications. Examples of these additives may be those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), ACTICIDE® B20 (THOR Specialties, Inc.), ACTICIDE® M20 (THOR Specialties, Inc.), and combinations thereof. In a particular example, the fusing agent can include a mixture of ACTICIDE® B20 and ACTICIDE® M20. The biocide can be present in the fusing agent in an amount from 0.01 wt % to 1 wt %. In more specific examples, the biocide can be present in an amount from 0.1 wt % to 0.4 wt %.

Sequestering agents, such as EDTA (ethylene diamine tetra acetic acid), may be included to eliminate the deleterious effects of heavy metal impurities, and buffer solutions may be used to control the pH of the fluid. From 0.01 wt % to 2 wt %, for example, can be used. A chelating agent such as Triton® M available from BASF can also be included. In a particular example, a chelating agent can be included in an amount from 0.04 wt % to 0.1 wt %. Viscosity modifiers and buffers may also be present, as well as other additives to modify properties of the fluid as desired. Such additives can be present at from 0.01 wt % to 20 wt %.

Anti-kogation agents can be added to the fusing agent to reduce build-up of residues on the resistor element in a thermal fluid jet system used to print the fusing agent. In some examples, the anti-kogation agent can include phosphate esters, polyelectrolyte polymers, inorganic phosphate buffers such as $Na_2HPO_3$ or $NaH_2PO_3$, and combinations thereof. Suitable anti-kogation agents can include Crodafos™ O3A available from Croda; Cabosperse™ K-7028 polyacrylate available from Lubrizol; and combinations thereof. Sequestering and/or chelating agents can also be used for anti-kogation, such as EDTA or Triton® M available from BASF. In certain examples, the anti-kogation agents can be included in the fusing agent in an amount from 0.01 wt % to 1 wt %. In more specific examples, the total amount of anti-kogation agents in the fusing agent can be from 0.2 wt % to 0.6 wt % or from 0.4 wt % to 0.5 wt %.

In further examples of the presently disclosed technology, the fusing agent can be formulated for use at elevated temperatures, such as temperatures from 50° C. to 95° C. In more specific examples, the fusing agent can be formulated for use at temperatures from 70° C. to 85° C. Because the 3-dimensional printing processes described herein can involve heating polymer powder to fuse the polymer powder, the fusing agent can often be exposed to elevated temperatures. In some cases, the fusing agent can be contained in a reservoir that may be positioned near the powder bed. Thus, the fusing agent can be formulated to be stable and jettable within the above temperature ranges. Moreover, the fusing agent can be exposed to even higher temperatures after being printed onto the powder bed. The powder bed can often be preheated to a preheat temperature such as 140° C. to 160° C., and the temperature of the powder bed during fusing can reach temperatures even as high as 220° C. Therefore, the fusing agent can be formulated to be safe and effective when used at these high temperatures. In one example, the fusing agent can be substantially devoid of flammable co-solvents or other ingredients that would create a fire risk at the temperatures employed in the 3-dimensional printing process. For example, the fusing agent can be devoid of co-solvents or other ingredients with an autoignition temperature below 220° C.

As mentioned above, the material sets according to the presently disclosed technology can also include a detailing agent. The detailing agent can be formulated for use in the same systems as the fusing agent described above. For example, the detailing agent and fusing agent can each be formulated for printing from a fluid jet printhead. Thus, the detailing agent can include any of the various ingredients and additives described above with respect to the fusing agent. However, the detailing agent can be devoid of the carbon black pigment used as an energy absorber in the fusing agent.

In some examples, the detailing agent can be formulated to provide a cooling effect on portions of the thermoplastic polymer powder bed onto which the detailing agent may be applied. This cooling effect can be achieved, for example, by evaporation of water and/or co-solvents in the detailing agent. While the fusing agent can also produce an initial cooling effect due to evaporation of water and co-solvents in the fusing agent, the fusing agent can produce a net heating effect due to the energy absorber present in the fusing agent. The detailing agent can be devoid of the energy absorber used in the fusing agent, and therefore the detailing agent can have a net cooling effect. When the detailing agent may be printed onto the powder bed around the edges of the portion printed with the fusing agent, the respective cooling and heating effects of the detailing agent and fusing agent, respectively, can produce a sharp boundary between the fused portion and the unfused portions of the powder bed.

As mentioned above, in some examples the detailing agent can be devoid of carbon black pigment and other energy absorbers. However, it should be noted that most if not all materials absorb some amount of electromagnetic energy and convert the energy to heat. Therefore, as used herein, "devoid of energy absorbers" does not imply that the detailing agent is devoid of any ingredients that can absorb electromagnetic energy in any amount. Rather, the detailing agent can be devoid of the specific energy absorbers disclosed as being optionally included in the fusing agent for the purpose of absorbing electromagnetic energy.

In certain examples, the detailing agent can include one or more dyes to improve the coloration at surfaces of the 3-dimensional printed part. In a specific example, the detailing agent can include a black dye and a cyan dye. As a type of colorant, dyes tend to absorb more electromagnetic energy than some other ingredients. However, the dyes used in the detailing agent can be absorb relatively less energy compared to the carbon black pigments and other energy absorbers included in the fusing agent. Furthermore, the detailing agent can include dyes at a lower concentration compared to the concentration of the carbon black pigment in the fusing agent. Thus, the amount of energy absorbed by the dyes in the detailing agent can be much less than the amount of energy absorbed by the carbon black pigment in the fusing agent. In a particular example, the dyes in the detailing agent can be present in a sufficiently small amount that the detailing agent produces a net cooling effect even when the dyes absorb some electromagnetic energy during curing the of the powder bed.

The detailing agent can include one or more co-solvents of the same types described above with respect to the fusing agent. In a particular example, the detailing agent can include one or more co-solvents including tripropylene glycol methyl ether, triethylene glycol, 2-pyrrolidone, or combinations thereof. In a certain example, the detailing agent can include triethylene glycol and 2-pyrrolidone. In a more specific example, the detailing agent can include triethylene glycol and 2-pyrrolidone, wherein the amount of triethylene glycol in the detailing agent may be greater than the amount of 2-pyrrolidone in the detailing agent.

The co-solvent can be included in an amount from 10 wt % to 20 wt % with respect to the total weight of the detailing agent. In a particular example, the detailing agent can include triethylene glycol in an amount from 5 wt % to 15 wt % and 2-pyrrolidone in an amount from 2 wt % to 5 wt %.

In certain examples, a material set can include a fusing agent and a detailing agent, wherein the detailing agent includes a smaller concentration of co-solvent compared to the fusing agent. In some examples, the detailing agent can include a greater concentration of water than the fusing agent. In one example, the detailing agent can include water in an amount from 70 wt % to 90 wt % with respect to the total weight of the detailing agent. Using a greater amount of water in the detailing agent can improve the cooling ability of the detailing agent. Conversely, using a greater amount of co-solvent can reduce the initial cooling caused by evaporation of water from the fusing agent, so that the fusing agent can have a greater heating effect overall.

In a further example, a material set can include a fusing agent and a detailing agent that each includes both triethylene glycol and 2-pyrrolidone as co-solvents. However, the fusing agent can include a ratio of 2-pyrrolidone to triethylene glycol that is greater than 1:1, while the detailing agent can include a ratio of 2-pyrrolidone to triethylene glycol that is less than 1:1. In some cases, 2-pyrrolidone can lower the fusing temperature of the thermoplastic polymer powder. Thus, using a greater amount of 2-pyrrolidone in the fusing agent can improve fusing of the thermoplastic polymer particles than have been printed with the fusing agent by causing the particles to fuse at a lower temperature.

As mentioned above, the detailing agent can include a black dye and a cyan dye to improve coloration of the surfaces of the 3-dimensional printed part. In certain examples, the black dye can be present in an amount from 1 wt % to 4 wt % with respect to the total weight of the detailing agent. Some black dyes can produce coloration in the thermoplastic polymer particles that is slightly different than the color of the fused polymer that incorporates the carbon black pigment of the fusing agent. For example, some black dyes can produce a brownish color or purplish color or another color other than neutral black when printed onto polymer powder. Accordingly, in some examples cyan dye can be included in the detailing agent to adjust the color. The cyan dye can adjust the color to a more neutral black color. Other dyes can also be added to adjust the color to match the black color of the fused 3-dimensional printed part.

In certain examples, the detailing agent can include a black dye and a cyan dye with a weight ratio of black dye to cyan dye from 3:1 to 10:1. In a particular example, the weight ratio of black dye to cyan dye can be from 4:1 to 5:1. In further examples, the total amount of dye included in the detailing agent can be from 1 wt % to 5 wt %. In further examples, the detailing agent can include the black dye in an amount from 1 wt % to 4 wt % and the cyan dye in an amount from 0.1 wt % to 1 wt %. In a more specific example, the detailing agent can include the black dye in an amount from 1.5 wt % to 2.5 wt % and the cyan dye in an amount from 0.2 wt % to 0.6 wt %.

Black dyes that can be used in the detailing agent can include Direct Black 154, Direct Black 168, Fast Black 2, Direct Black 171, Direct Black 19, Acid Black 1, Acid Black 191, Mobay Black SP, Acid Black 2, Pacified RB31, Projet™ Fast Black 2 (FUJIFILM Imaging Colorants Inc.), or combinations thereof. In a more specific example, the black dye can include Pacified RB31, Projet™ Fast Black 2, or combinations thereof.

Cyan dyes that can be used in the detailing agent can include Azure B, Azure B Eosinate (Sigma-Aldrich Chemical Company), Direct Blue 199 (Ilford AG, Switzerland), Orasol® Blue (Ciba-Geigy Corp.), Acid Blue 9, or combinations thereof. In a particular example, the cyan dye can be Acid Blue 9.

In additional examples of the material sets according to the present technology, the material sets can include a thermoplastic polymer powder. The thermoplastic polymer powder can have an average particle size from 10 microns to 100 microns. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles. In further detail, and in accordance with certain specific examples, the particle size distribution of the thermoplastic polymer powder can be as follows: D50 can be from 45 microns to 75 microns, from 55 microns to 65 microns, or about 60 µm; D10 can be from 10 microns to 50 microns, from 30 microns to 40 microns, or about 35 microns; and D90 can be from 75 microns to 150 microns, from 80 microns to 95 microns, or about 90 microns. "D50" is defined as the median weight. "D10" is defined as the tenth-percentile by weight of powder that is below a given particle size, e.g., from 20 microns to 50 microns. "D90" is defined as the ninetieth-percentile by weight of powder that is below a given particle size, e.g., 75 microns to 100 microns.

In certain examples, the thermoplastic polymer particles can have a variety of shapes, such as substantially spherical particles or irregularly-shaped particles. In a particular example, the thermoplastic polymer powder can have a sphericity of at least 0.7. As used herein, "sphericity" refers to a ratio of the surface area of a sphere having the same volume as a particle to the actual surface area of the particle. Additionally, in some examples the thermoplastic polymer particles can have a BET surface area of less than 15 $m^2/g$.

In some examples, the polymer powder can be capable of being formed into 3-dimensional printed parts with a resolution of 10 to 200 microns. As used herein, "resolution" refers to the size of the smallest feature that can be formed on a 3-dimensional printed part. The polymer powder can form layers from about 10 to about 200 microns thick, allowing the fused layers of the printed part to have roughly the same thickness. This can provide a resolution in the z-axis direction of about 10 to about 200 microns. The polymer powder can also have a sufficiently small particle size and sufficiently regular particle shape to provide about 10 to about 200 micron resolution along the x-axis and y-axis.

In some examples, the thermoplastic polymer powder can be colorless. For example, the polymer powder can have a white, translucent, or transparent appearance.

The thermoplastic polymer powder can have a fusing temperature from about 70° C. to about 350° C. In further examples, the polymer can have a fusing temperature from about 150° C. to about 200° C. As used herein, "fusing temperature" refers to the lowest temperature at which particles of the thermoplastic polymer powder fuse together to form a solid object. In some cases, this temperature can be referred to as a melting temperature, softening temperature, or flow temperature. Not all thermoplastic polymers have a specific melting temperature, as some polymers experience a gradual reduction in viscosity with increasing temperature. With such polymers, the particles can begin to flow sufficiently to fuse with neighboring polymer particles at the fusing temperature.

A variety of thermoplastic polymers with fusing temperatures in these ranges can be used. For example, the polymer powder can be a polyamide-6 powder, polyamide-9 powder, polyamide-11 powder, polyamide-12 powder, polyamide-66 powder, polyamide-612 powder, polyethylene powder, thermoplastic polyurethane powder, polypropylene powder, polyester powder, polycarbonate powder, polyether ketone powder, polyacrylate powder, polystyrene powder, or combinations thereof.

In a specific example, the polymer powder can be a polyamide powder such as polyamide-11 or polyamide-12, which can have a melting point from about 180° C. to about 200° C. In some examples, the polyamide powder can be a semi-crystalline powder having a degree of crystallinity from 10% to 90%, which can be measured using differential scanning calorimetry. The polyamide powder can have a recrystallization temperature from 130° C. to 160° C. Additionally, the polyamide powder can have an enthalpy of fusion from 80 J/g to 130 J/g.

In further examples, the polyamide powder can have a number average molecular weight $M_n$ from 10,000 to 500,000 and a polydispersity index (defined as $M_w/M_n$) from 1 to 5. Additionally, the molecular weight of polyamide powder can be characterized using solution viscosity as a proxy for molecular weight. "Solution viscosity" is defined by combining 0.5 wt % polyamide-12 powder with 99.5 wt % M-cresol and measuring the viscosity of the admixture. Further details for determining solution viscosity under this measurement protocol are described in International Standard ISO 307, Fifth Edition, 2007 May 15. In some examples, the polyamide powder used in the material sets of the presently disclosed technology can have a solution viscosity from 1.4 to 2.0.

The thermoplastic polymer particles can also in some cases be blended with a filler. The filler can include inorganic particles such as alumina, silica, glass particles, metal particles, or ceramic particles, e.g. glass beads, steel balls, or metal grains, or other pigments, e.g. transition metal oxides, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from 99.9:0.1 to 1:2, from 99:1 to 1:1, or from 5:1 to 1:1. The filler particles can have a variety of particle sizes depending on the type of filler material. In some examples, the filler particles can have an average particle size from 5 nm to 200 microns, from 10 nm to 150 microns, or from 100 nm to 100 microns.

Figure 3:
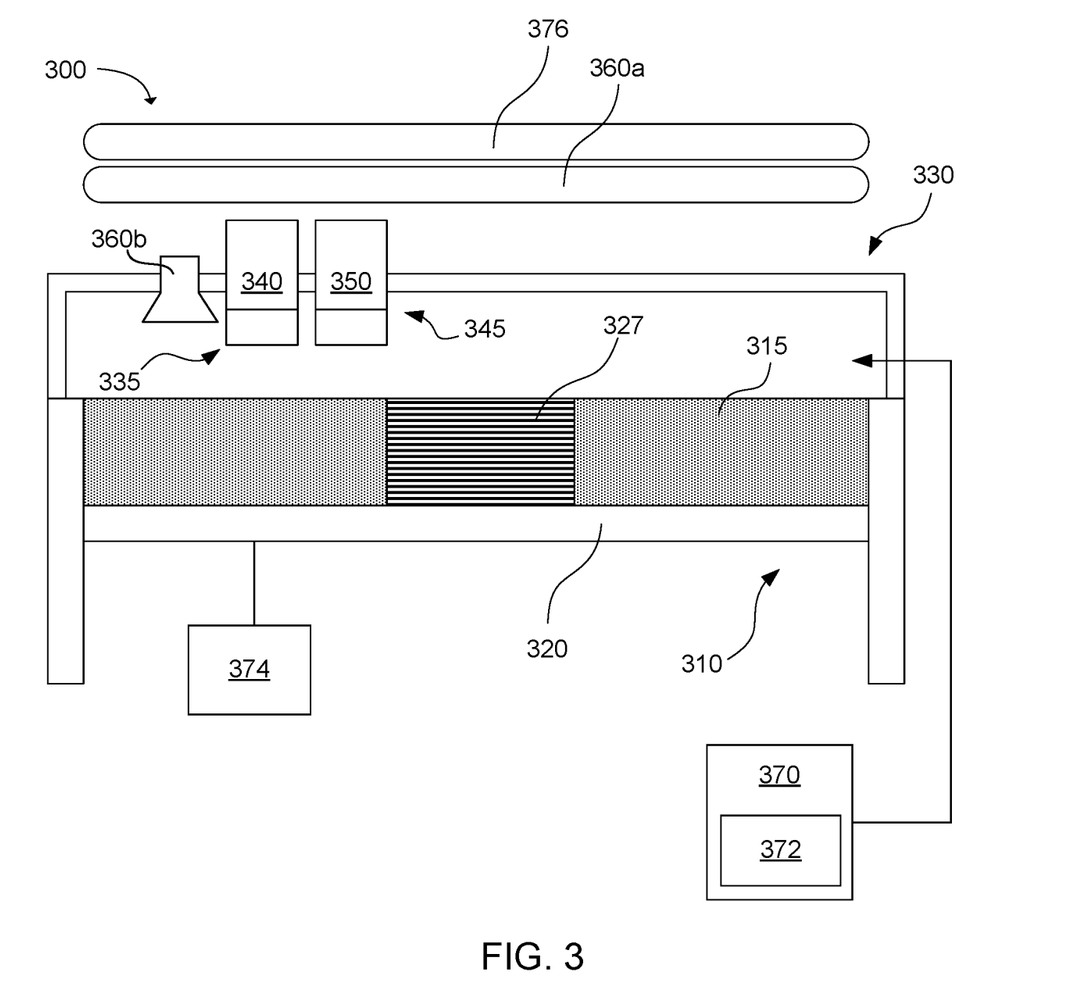
FIG. 3 is a schematic view of a 3-dimensional printing system in accordance with examples of the present disclosure.

In addition to the material sets described above, the present technology also encompasses 3-dimensional printing systems that include the material sets. An example of a 3-dimensional printing system is shown in FIG. 3. The system 300 includes a powder bed 310 including a powder bed material 315, which includes the thermoplastic polymer powder described herein and has an average particle size from 10 microns to 200 microns. In the example shown, the powder bed has a build platform or moveable floor 320 that allows the powder bed to be lowered after each layer of the 3-dimensional part is printed. The 3-dimensional part 327 is shown after printing the fusing agent 340 on the powder bed material. The system also includes a fluid jet printer 330 that includes a first fluid jet pen 335 in communication with a reservoir of the fusing agent 340. The first fluid jet pen can be configured to print the fusing agent onto the powder bed. A second fluid jet pen 345 is in communication with a reservoir of a detailing agent 350. The second fluid jet pen can be configured to print the detailing agent onto the powder bed. In some examples, the 3-dimensional printing system can also include additional fluid jet pens in communication with a reservoir of fluid to provide other colors and/or functionality.

After the fusing agent 340 has been printed onto the powder bed material 315, a fusing radiation source, such as a fusing lamp 360*a* or 360*b*, can be used to expose the powder bed to electromagnetic radiation sufficient to fuse the powder that has been printed with the fusing agents. Fusing lamp 360*a* may be a stationary fusing lamp that rests above the powder bed, and fusing lamp 360*b* may be carried on a carriage with the fluid jet pens 335, 345. To print the next layer, the moveable floor is lowered and a new layer of powder bed material is added above the previous layer. Unused powder bed material, such as that shown at 315, is not used to form the 3-dimensional part, and thus, can be recycled for future use. Recycling can include refreshing the used powder bed material with a relatively small percentage of fresh powder bed material, e.g., as little as up to 20 wt %, up to 10 wt %, or up to 5 wt %.

To achieve good selectivity between the fused and unfused portions of the powder bed, the fusing agents can absorb enough electromagnetic radiation or energy to boost the temperature of the thermoplastic polymer powder above the melting or softening point of the polymer, while unprinted portions of the powder bed remain below the melting or softening point. Thus, as mentioned, the 3-dimensional printing system can include preheaters for preheating the powder bed material, to a temperature near the melting or softening point. In one example, the system can include a preheater(s) to heat the powder bed material prior to printing. For example, the system may include a print bed heater 374 to heat the print bed to a temperature from 100° C. to 160° C., or from 120° C. to 150° C. The system can also include a supply bed or container 370 which also includes a supply heater 372 at a location where polymer particles may be stored before being spread in a layer onto the powder bed 310. The supply bed or container can utilize the supply heater to heat the supply bed or container to a temperature from 90° C. to 140° C. Thus, when an overhead heating source 376, e.g., heating lamps, may be used to heat up the powder bed material to a printing temperature, the typical minimum increase in temperature for printing can be carried out quickly, e.g., up to about 160° C. to 220° C. To be clear, the overhead heating source used to heat the powder bed material for printing is typically a different energy source than the electromagnetic radiation source, e.g., fusing lamp 360a or 360b, used to thermally activate the energy absorber, though these energy sources could be the same depending on the energy absorber and powder bed material chosen for use.

Suitable fusing radiation sources or lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to fuse each printed layer. The fusing lamp can be configured to irradiate the entire powder bed with a substantially uniform amount of energy. This can selectively fuse the printed portions with fusing agents leaving the unprinted portions of the powder bed material below the fusing temperature of the polymer powder.

Depending on the amount of energy absorber present in the polymer powder, the absorbance of the energy absorber, the preheat temperature, and the fusing temperature of the polymer powder, an appropriate amount of irradiation can be supplied from the fusing radiation source or lamp. In some examples, the fusing lamp can irradiate individual layers from about 0.5 to about 10 seconds per pass.

It is noted that, as used in this specification and the appended claims, the singular forms "a," "an," and "the" include plural referents unless the context clearly dictates otherwise.

As used herein, "liquid vehicle" refers to a liquid in which additives may be placed to form fluid jettable formulations, such as fusing agent, detailing agents, inks, functional fluids, etc. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and energy absorbers, the liquid vehicle can carry solid additives such as polymers, latexes, UV curable materials, plasticizers, salts, etc.

The term "fluid" herein does not exclude solid additives that may be suspended therein, as fluid generally includes both solutions and fine dispersions, such as in fusing agents, detailing agents, inks, functional fluids, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 5 wt %.

As used herein, "fluid jetting" or "jetting" refers to compositions that may be ejected from jetting architecture, such as inkjet architecture or fluid jet architecture, e.g., thermal or piezo architecture. Additionally, such architecture can be configured to print varying drop sizes such as less than 10 picoliters, less than 20 picoliters, less than 30 picoliters, less than 40 picoliters, less than 50 picoliters, etc.

The term "thermoplastic polymer powder" refers to relatively fine thermoplastic particles with an average particle size from 10 μm to 200 μm. The thermoplastic polymer powder can have a melting or softening point from about 70° C. to about 350° C., and can include polymers such as nylons or polyamides, polyethylenes, thermoplastic polyurethanes, polypropylenes, polyesters, polycarbonates, polyether ketones, polyacrylates, polystyrenes, etc. The term "powder" can be used interchangeably with "particle" or "particulate."

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described

EXAMPLES

The following illustrates several examples of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

Five detailing agents were formulated having the compositions shown in Table 1:

TABLE 1

| | | Detailing Agent No. | | | | |
|---|---|---|---|---|---|---|
| | | 1 | 2 | 3 | 4 | 5 |
| | | (content in wt % of detailing agent) | | | | |
| Co-solvents | Tri propylene glycol methyl ether (TPGME) | 16.00 | 15.00 | 15.00 | | |
| | Triethylene glycol (3EG) | | | | 11.00 | 11.00 |
| | 2-Pyrrolidinone (2-P) | | | | 4.00 | 4.00 |
| Surfactant | Surfynol ® SEF | 0.85 | 0.85 | 0.85 | 0.85 | 0.85 |
| | Capstone ® FS-35 | 0.05 | 0.05 | | | |
| Anti-kogation and chelating additives | Crodafos ™ O3A | 0.30 | 0.30 | 0.50 | 0.50 | 0.50 |
| | Trilon ® M | | | 0.05 | 0.05 | 0.05 |
| Biocide | ACTICIDE ® B20 | 0.18 | 0.18 | 0.18 | 0.18 | 0.18 |
| | ACTICIDE ® M20 | 0.14 | 0.14 | 0.14 | 0.14 | 0.14 |
| Dyes | Pacified RB31(black dye) | | 1.75 | | 2.25 | 2.00 |
| | Acid Blue 9 (cyan dye) | | | 0.35 | 0.40 | 0.50 |
| | Projet ™ Fast Black 2 (black dye) | | | 1.75 | | |
| Water content | | 82.48 | 81.38 | 81.18 | 80.63 | 80.78 |
| pH | | 8.0 to 8.2 | 8.0 to 8.2 | 8.0 to 8.2 | 8.0 to 8.2 | 8.0 to 8.2 |

Surfynol ® SEF is available from Air Products.
Capstone ® FS-35 is available from DuPont.
Crodafos ™ O3A is available from Croda.
Trilon ® M is available from BASF.
ACTICIDE ® B20 and ACTICIDE ® M20 are available from THOR Specialties, Inc.
Projet ™ Fast Black 2 is available from FUJIFILM Imaging Colorants Inc.

Example 2

Detailing agents Nos. 4 and 5 were compared. An additional detailing agent (2B) was also prepared which had all the ingredients of detailing agent 2, but with the dye amounts used in detailing agent 5 (2.00 wt % Pacified RB31). Each of these detailing agents was used in a 3-dimensional printing system to print parts formed from polyamide-12 powder. The detailing agents were printed at a contone level of 120 in a 0.5 mm-wide strip around the edges of the part layers. The detailing agents were also printed in a 0.1 mm-wide strip overlapping inside the edges of the part layers. Characteristics of the printed parts are shown in Table 2:

TABLE 2

| | Detailing Agent No. | | |
|---|---|---|---|
| | 2B | 4 | 5 |
| Z surface KOD | 1.16 | 1.13 | 1.18 |
| Z surface L*a*b* | 32.72, 1.14, −4.4 | 33.95, 1.2, −3.19 | 32.68, 0.859, −3.04 |
| Appearance | Grey/blueish | Grey/light purple | Dark grey |
| Open holes (thermal bleed) | 2 mm holes fused | 2 mm holes fused | 3 mm holes fused |
| Drop volume change at 350 MDPN | <10% | <10% | <10% |

TABLE 2-continued

| | Detailing Agent No. | | |
|---|---|---|---|
| | 2B | 4 | 5 |
| Drop velocity change at 350 MPDPN | <10% | <10% | <10% |
| Decap | no issues | no issues | no issues |

Detailing agent 5 had the darkest color as shown by the Z surface KOD and Z surface L*a*b*. "Z surface KOD" refers to the optical density of surfaces which are perpendicular to the build direction (i.e., z-axis direction). "Z surface L*a*b*" refers to color space measurements of surfaces which are perpendicular to the build direction. Thermal bleed was tested by designing the part with open 2 mm or 3 mm diameter holes. The holes were fused in each of the parts, showing that thermal bleed was occurring. Each of the detailing agents had satisfactory kogation performance, as shown by the drop volume and drop velocity change after 350 MDPN (million drops per nozzle). None of the detailing inks had issues with decap performance.

Example 3

In a separate test, detailing agents 4 and 5 were used again to print 3-dimensional parts and the parts were evaluated. The detailing agents were printed in a 0.5 mm-wide strip around the edges with a 0.1 mm-wide overlap with the part layers as in Example 2 above, but in this test the detailing agents were printed at a contone level of 160. The results are shown in Table 3:

TABLE 3

| | Detailing Agent No. | |
|---|---|---|
| | 4 | 5 |
| Z surface KOD | 1.256 | 1.296 |
| Z surface L*a*b* | 30.07, 1.37, −1.91 | 28.73, 0.649, −2.202 |

TABLE 3-continued

| | Detailing Agent No. | |
|---|---|---|
| | 4 | 5 |
| Appearance | Dark grey/reddish, earthy | Dark grey, blueish |
| Open holes (thermal bleed) | 1 mm holes fused, some 2 mm holes fused | 1 mm holes fused, 2 mm holes open |

Detailing agent 5 had superior optical density and a slightly blueish grey color in contrast with the reddish grey color of detailing agent 4. Detailing agent 5 was also better at preventing thermal bleed, as shown by the open 2 mm holes.

What is claimed is:

1. A material set, comprising:
   a detailing agent, comprising:
      water,
      a black dye,
      a cyan dye, and
      a water-soluble co-solvent consisting of triethylene glycol and 2-pyrrolidone, present in the detailing agent at an amount from 10 wt % to 20 wt %; and
   a fusing agent, comprising:
      water, and
      a carbon black pigment.

2. The material set of claim 1, wherein a weight ratio of the black dye to the cyan dye is from 3:1 to 10:1.

3. The material set of claim 1, wherein the black dye is present in an amount from 1 wt % to 4 wt % with respect to the total weight of the detailing agent.

4. The material set of claim 1, wherein the detailing agent includes the water in an amount from 70 wt % to 90 wt %.

5. The material set of claim 1, wherein the triethylene glycol is present in an amount from 5 wt % to 15 wt % with respect to the total weight of the detailing agent, and wherein the 2-pyrrolidone is present in an amount from 2 wt % to 5 wt % with respect to the total weight of the detailing agent.

6. The material set of claim 1, wherein the fusing agent further comprises a water-soluble co-solvent consisting of triethylene glycol and 2-pyrrolidone, and wherein the triethylene glycol in the fusing agent is present in an amount ranging from 5 wt % to 20 wt % with respect to the total weight of the fusing agent, and the 2-pyrrolidone in the fusing agent is present in an amount ranging from 10 wt % to 40 wt % with respect to the total weight of the fusing agent.

7. The material set of claim 6, wherein a ratio of 2-pyrrolidone to triethylene glycol in the detailing agent is less than 1:1; and wherein a ratio of 2-pyrrolidone to triethylene glycol in the fusing agent is greater than 1:1.

8. The material set of claim 1, wherein a ratio of 2-pyrrolidone to triethylene glycol in the detailing agent ranges from 0.33:1 to 0.4:1.

9. A material set, comprising:
   a detailing agent, comprising:
      water,
      a black dye,
      a cyan dye, and
      a water-soluble co-solvent consisting of triethylene glycol and 2-pyrrolidone, present in the detailing agent at an amount from 10 wt % to 20 wt %;
   a fusing agent, comprising:
      water, and
      a carbon black pigment; and
   a thermoplastic polymer powder.

10. The material set of claim 9, wherein the thermoplastic polymer powder has an average particle size from 10 microns to 200 microns.

11. The material set of claim 9, wherein the thermoplastic polymer powder comprises polyamide-6 powder, polyamide-9 powder, polyimide-11 powder, polyamide-12 powder, polyamide-66 powder, polyamide-612 powder, polyethylene powder, thermoplastic polyurethane powder, polypropylene powder, polyester powder, polycarbonate powder, polyether ketone powder, polyacrylate powder, polystyrene powder, or a combination thereof.

12. The material set of claim 9, wherein a weight ratio of the black dye to the cyan dye is from 3:1 to 10:1.

13. The material set of claim 9, wherein the black dye is present in an amount from 1 wt % to 4 wt % with respect to the total weight of the detailing agent.

* * * * *